United States Patent

Frey et al.

[11] Patent Number: 5,992,551
[45] Date of Patent: Nov. 30, 1999

[54] METHOD AND ARRANGEMENT FOR CONTROLLING AND LIMITING THE SPEED OF A VEHICLE

[75] Inventors: Thomas Frey, Hassmersheim; Tobias Roulet, Leonberg, both of Germany

[73] Assignee: Robert Bosch GmbH, Stuttgart, Germany

[21] Appl. No.: 08/757,773

[22] Filed: Nov. 27, 1996

[30] Foreign Application Priority Data

Dec. 30, 1995 [DE] Germany .......................... 195 49 224

[51] Int. Cl.[6] .................................................. B60K 31/04
[52] U.S. Cl. ........................................... 180/179; 701/94
[58] Field of Search .................................. 180/170, 178, 180/179; 701/93, 94

[56] References Cited

U.S. PATENT DOCUMENTS

| 4,337,511 | 6/1982 | Schneider et al. | 180/179 |
| 4,835,696 | 5/1989 | Suzuki et al. | 180/179 |
| 5,155,687 | 10/1992 | Katayama | 180/179 |
| 5,177,682 | 1/1993 | Oo et al. | 180/179 |
| 5,177,683 | 1/1993 | Oo et al. | 180/179 |
| 5,781,876 | 7/1998 | Saur | 180/179 |

FOREIGN PATENT DOCUMENTS

| 2924391 | 12/1980 | Germany . | |
| 4038432 | 6/1992 | Germany . | |
| 4-31135 | 2/1992 | Japan | 180/179 |
| 95/15868 | 6/1995 | WIPO . | |

*Primary Examiner*—J. J. Swann
*Assistant Examiner*—Frank Vanaman
*Attorney, Agent, or Firm*—Walter Ottesen

[57] ABSTRACT

A method and an arrangement for controlling or limiting the speed of a vehicle includes a controller which limits or controls the speed of the vehicle to a pregiven value. There is a movement out of or into the control region by actuating or releasing the accelerator pedal. When reentering into the control region, the controller starts with a start value which takes into account the speed trace in the phase after leaving the control region.

11 Claims, 6 Drawing Sheets

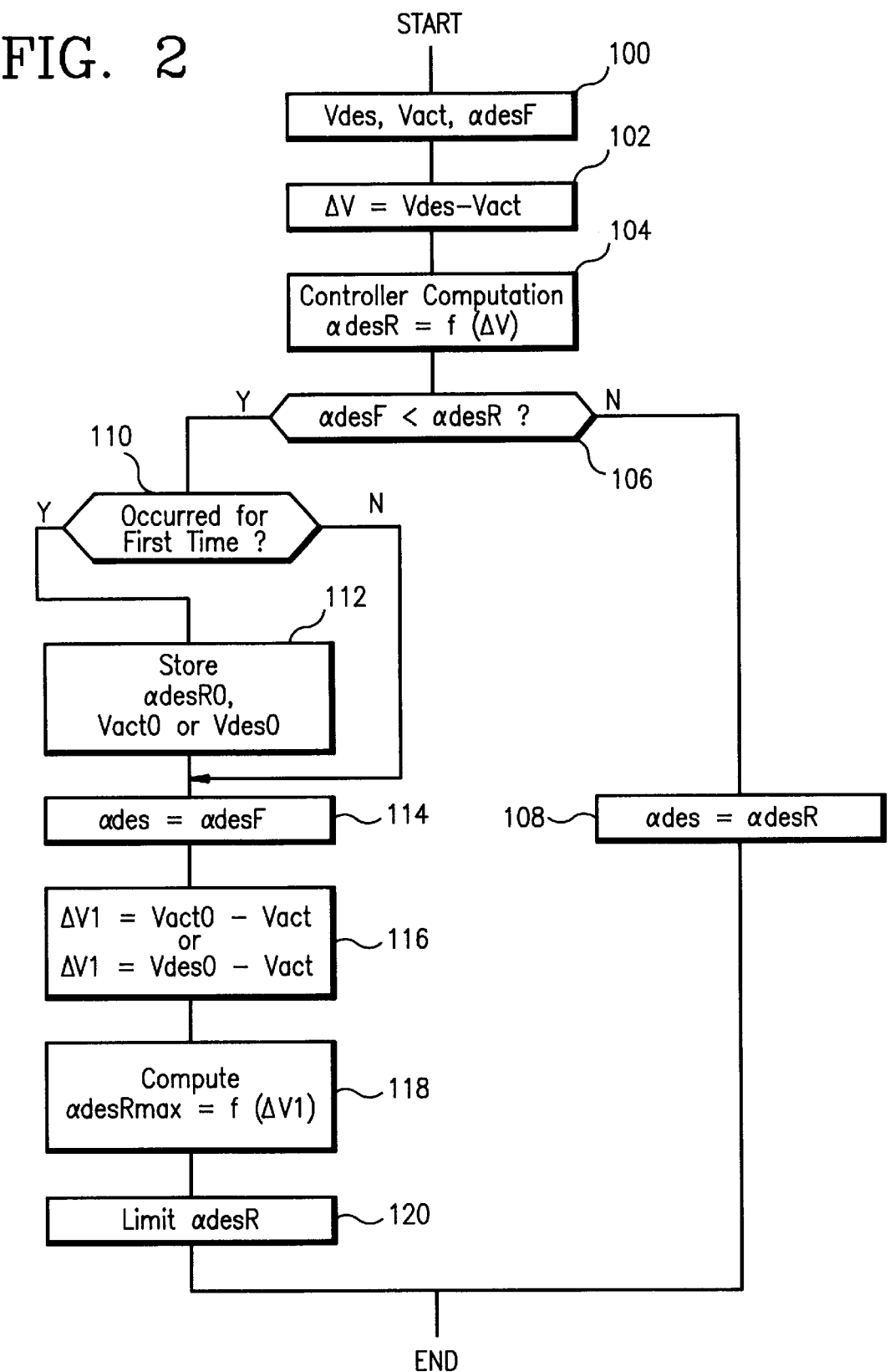

METHOD AND ARRANGEMENT FOR CONTROLLING AND LIMITING THE SPEED OF A VEHICLE

BACKGROUND OF THE INVENTION

A method and an arrangement for controlling the speed of a vehicle are discloses in German patent publication 2,924, 391. Here, a power adjusting element of the drive unit of the motor vehicle is adjusted, on the one hand, via the accelerator pedal actuation of a driver and, on the other hand, via the limiting controller operating on the basis of the difference between the actual speed and the limit speed. The adjustment of the power adjusting element is dependent upon the position of the accelerator pedal as long as the limit speed is not reached. If the driver actuates the accelerator pedal in such a manner that the limit speed is exceeded, then the power adjusting element is adjusted by the limit controller in the sense of maintaining the limit speed. If, in this operating state, the driver takes his foot from the accelerator pedal, then the power adjusting element is closed because the setting of the power adjusting element is dependent upon the position of the accelerator pedal.

The speed controller continues to run in the known state of the art. The output signal of the controller becomes very large as a consequence of the occurring control difference between the desired and actual speeds, that is, the output signal would drive the power adjusting element in the sense of higher power. If the driver again depresses the accelerator pedal in this driving state so that the speed again exceeds the limit speed, then high overshoots can be expected because of the start value of the speed controller which is too high.

A procedure known in the control art for avoiding such unwanted situations is to maintain the last controller value which occurs when moving out of the control range. This retained controller value then serves as a start value for a new entry into the control region. Driving uphill with subsequent depression of the accelerator pedal leads to the situation that the start value of the controller is too low and it therefore takes a long time until the desired speed is again reached.

U.S. patent application Ser. No. 08/652,582, filed Jun. 7, 1996, (corresponding to PCT patent publication WO 95/15868) discloses a road speed limiter wherein a desired acceleration of the vehicle is determined on the basis of the difference between desired speed and actual speed. A controller controls to this desired acceleration while considering the actual acceleration of the vehicle. The desired acceleration when reaching the desired speed is 0. In a controller concept of this kind, the driver can drive the power adjusting element in the sense of a power reduction when releasing the accelerator pedal. For this reason, corresponding problems occur.

A corresponding problematic results for speed controllers which are inhibited by the driver by actuating the accelerator pedal and are again enabled automatically when the driver releases the accelerator pedal. In this connection, reference can be made, for example, to German patent publication 4,038,432.

SUMMARY OF THE INVENTION

In view of the foregoing, it is an object of the invention to provide measures for controlling or limiting the road speed of a vehicle which improve the transition performance when again entering into the control region.

The method of the invention is for controlling or limiting the speed of a vehicle. The vehicle includes a controller having a control region and the vehicle is driven so that there is a movement out of the control region for at least one operating state and a reentry into the control region after this operating state. The method includes the steps of: utilizing the controller to limit or control the speed of the vehicle to a pregiven speed while in the control region; and, when the reentry into the control region of the controller takes place, starting the controller with a start value which takes into account the trace of the speed of the vehicle as a function of time during a previous operating state.

With the solution provided by the invention, an improved transition characteristic is obtained when reentering the control region of a speed controller or speed limiter. Especially, the start value of the particular controller used is fixed in such a manner that overshoots or undershoots are avoided.

It is especially advantageous that the solution of the invention can be utilized for a speed controller as well as for an acceleration controller.

In a speed limiter, it is especially advantageous that the disturbing influence of the driver is eliminated with the solution provided by the invention. This disturbing influence leads to unwanted oscillations before reaching the target speed.

It is especially advantageous that an upper limit (for the speed limiter) of the controller or a lower limit (for the speed controller) is computed outside of the control region. In this way, a simple effective adaptation method is defined after moving out of the control region until this control region is again entered.

BRIEF DESCRIPTION OF THE DRAWINGS

The invention will now be explained with reference to the drawings wherein:

FIG. 2 shows a flowchart showing the method of the invention in the context of a computer program;

DESCRIPTION OF THE PREFERRED EMBODIMENTS OF THE INVENTION

Figure 1:
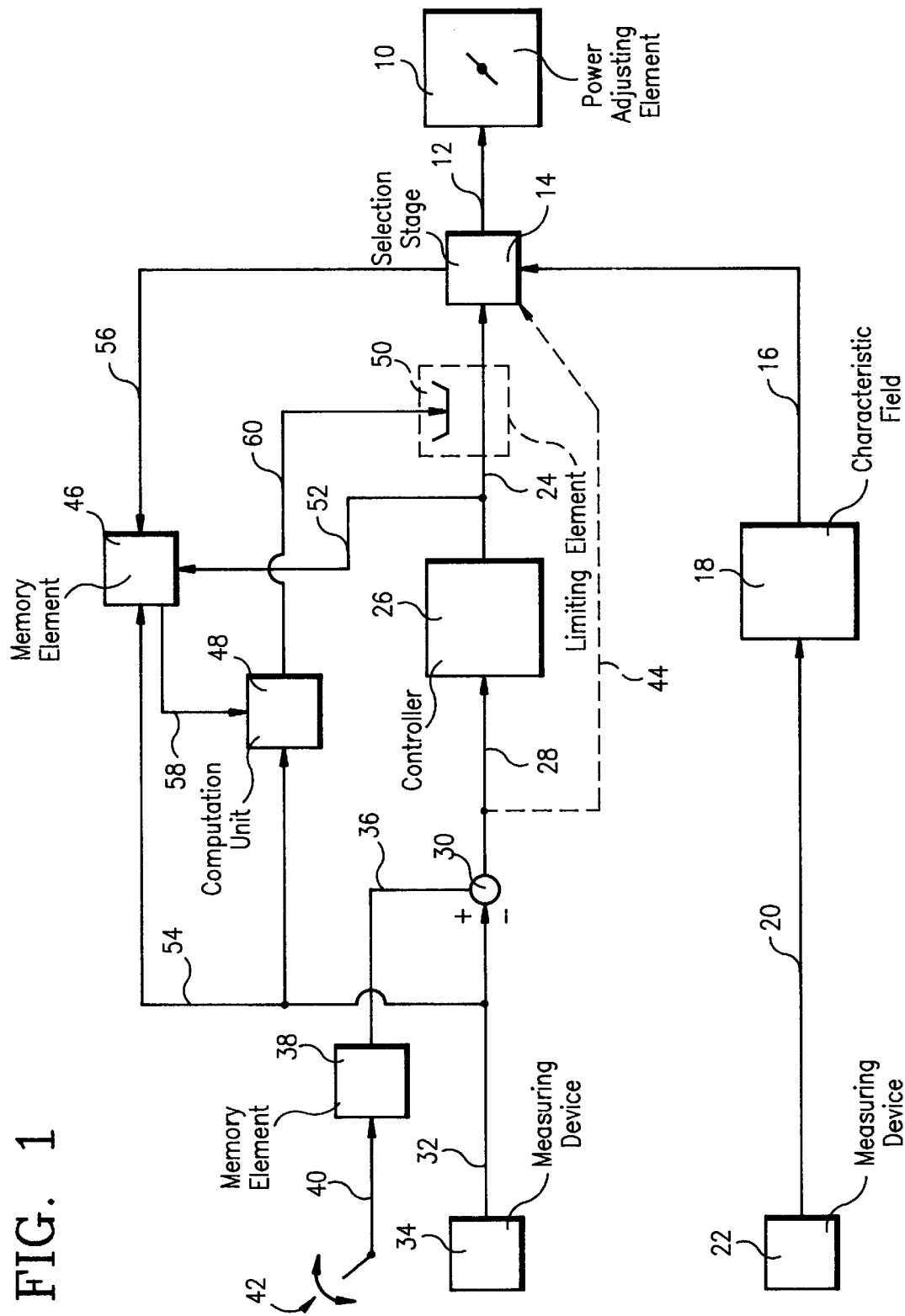
FIG. 1 is an overview block diagram of the solution provided by the invention according to a first embodiment of a speed controller utilized for limiting speed.

FIG. 1 shows a power adjusting element 10 of the drive unit of a motor vehicle. The power adjusting element 10 is preferably a throttle flap of an internal combustion engine which is supplied with an actuation signal via drive line 12. The drive line 12 is connected to a selection stage 14. A characteristic field or computation element 18 is connected to the selection stage 14 via a line 16. A line 20 connects a measuring device 22 to the characteristic field or computation element 18. The measuring device 22 detects the position of an operator-actuated element such as an accelerator pedal actuated by the driver. A line 24 defines the output line of the controller 26 and connects the controller to the selection stage 14. The control deviation is supplied to the controller 26 from the comparator 30 via input line 28. A measuring device 34 detects the speed of the vehicle and is connected to the comparator 30 via a line 32. Also, a line 36 from a memory element 38 is connected to the comparator 30. The signals of an operator-actuated lever 42 to select the desired speed or the limit speed are supplied to the memory element 38 via the line 40.

In a speed limiter of the kind referred to above, the driver selects the desired speed to be maintained by actuating the operator-actuated lever 42. The desired speed is supplied to the comparator 30. At the comparator, the difference between the desired speed and the actual speed is computed and supplied to the controller 26. The actual speed is supplied via the line 32.

In the preferred embodiment, this controller has an imprecise steady state control characteristic and can, for example, be a PDT1-controller. The controller 26 emits an output signal to the selection stage 14 for controlling the power adjusting element and this output signal is dependent upon the control deviation. In an advantageous embodiment, this selection stage 14 emits a value to the power adjusting element for adjusting the engine power. This emitted value is selected from the supplied values.

The second signal defines the adjusting signal of the power adjusting element. This adjusting signal is derived from the accelerator pedal position and is supplied from the characteristic field 18 via the line 16. In the preferred embodiment, the selection of the signal to be supplied again is dependent upon the driver input and the adjusting quantity of the controller. If the adjusting value, which is dependent on the accelerator pedal, exceeds the adjusting value formed by the controller, the speed controller adjusts the adjusting element while, for a lower driver input value, this input value adjusts the adjusting element.

In another advantageous embodiment, the adjusting quantity is selected in dependence upon the speed difference (see broken line 44). If the difference is less than a pregiven threshold value, the adjusting element is adjusted by the controller.

The initially-mentioned problems occur in a road speed limiter of this kind. In order to avoid these problems, and according to the invention, the following are provided: a memory element 46, a computation unit 48 and a limiting element 50. A line 52 extends from line 24 and is connected to the memory element 46. Also, a line 54 extends from line 32 and is likewise connected to the memory element 46. A line 56 connects the selection stage 14 to the memory element 46. A line 58 leads from the memory element 46 to the computation element 48 which, in turn, has an output line 60 connected to the limiting element 50.

If the driver releases the accelerator pedal during speed control, then the memory element 46 is supplied with a signal via line 56 which indicates that there is a movement out of the control region of the controller and the power adjusting element 10 is controlled in accordance with the actuation of the accelerator pedal. In the memory element 46, this signal triggers the storage of the actual adjusting quantity of the controller 26 (line 52) and the actual speed (line 54) corresponding thereto. The corresponding values are supplied to the computing element 48. The computing element 48 determines the adjustable upper limit of the controller in accordance with the speed difference between the stored actual speed and the current actual speed starting from the adjusting quantity of the controller at the time point of moving out of the control region. In another embodiment, the computing element 48 determines the adjustable upper limit of the controller in accordance with the difference between the desired speed (which is assumed to be unchanged) and the actual speed starting from the adjusting quantity of the controller at the time point of leaving the controller region.

The controller itself is further active in this operating phase, that is, the controller computes an increasing controller output signal as a consequence of the occurring dropping speed caused by the accelerator pedal control. For this reason, and in the context of the speed limiter, only the upper limit of the controller is computed at which the output signal of the controller is maintained.

The controller upper limit is multiplied by a constant of the correct sign in the computing element 48 in dependence upon the speed difference. With increasing speed difference (that is, dropping actual speed), the upper limit increases. In the opposite case, with reducing difference (that is, with increasing speed), the upper limit drops. This constant is freely adjustable and is orientated on the following: the mass of the vehicle, the gear which is set and the controller amplification. If the driver again depresses the accelerator pedal so that the speed controller again intervenes to limit the speed, the controller starts when again entering into the control region with a start value formed on the basis of the actual speed difference.

For a road speed controller, which controls to a pregiven road speed (also when accelerating), leaving the control region results from an accelerator pedal actuation by the driver which requests a power greater than the power of the road speed controller. In the initially-mentioned road speed controller, the reentry into the control region takes place when the driver has released the pedal. In this case, and because the speed lies outside of the control region above the desired speed, a lower limit of the controller adjusting quantity is computed in a corresponding manner in lieu of the upper limit.

FIG. 2 shows a flowchart of a preferred embodiment of the method of the invention.

After the start of the subprogram, the following are read in at pregiven time points in step 100: the desired speed Vdes, the actual speed Vact and the adjusting value $\alpha$desF of the power adjusting element produced by the actuation of the accelerator pedal. Thereafter, in step 102, the difference $\Delta V$ between the desired speed and the actual speed is computed and, in the next step 104, the adjusting value $\alpha$desR of the speed controller is computed in dependence upon the speed difference. In a preferred manner, a controller is utilized having an output signal computed utilizing a recursive equation.

An example of a preferred controller type is the PDT1-controller which is a proportional controller having a limited integral component or a proportional-differential controller having a delay.

After step 104, a check is made in step 106 as to whether the driver input $\alpha$desF is less than the input $\alpha$desR of the controller. If this is not the case, then the vehicle is in the control region. For this reason, and in accordance with step 108, the power adjusting element is adjusted, for example, in the context of a control loop based on the adjusting value of the controller.

If, in contrast, the driver input is less than the input of the controller, then the system is outside of the control region of the speed controller. For this reason, a check is made in step 110 (which follows step 106) as to whether a movement has occurred out of the control region of the speed controller. If this is the case, then, according to step 112, the current adjusting value αdesR0 as well as the current actual speed Vact0 or the current desired value Vdes0 are stored. After step 112 (in the same manner as after a "no" answer in step 110), the adjusting quantity αdes of the power adjusting element is set in step 114 to the value αdesF pregiven by the driver and, in the next step 116, the difference speed ΔV1 is formed from the difference of the stored actual value Vact0 (or the desired value Vdes0) and the particular actual speed Vact then present. In the next step 118, the controller upper limit αdesRmax is computed in accordance with the speed difference ΔV1 and the controller adjusting signal αdesR, which was determined in step 104, is limited to the maximum value as may be required (step 120).

After step 220 or step 108, the subprogram is ended and repeated at a pregiven time. If the system again moves into the control region of the speed controller, then the controller computation in step 104 starts out from the limit value αdesRmax in the context of the recursion equation. This limit value αdesRmax corresponds to the operating situation at the reentry time point. Overshoots and undershoots are effectively avoided in this manner.

Figure 3A:
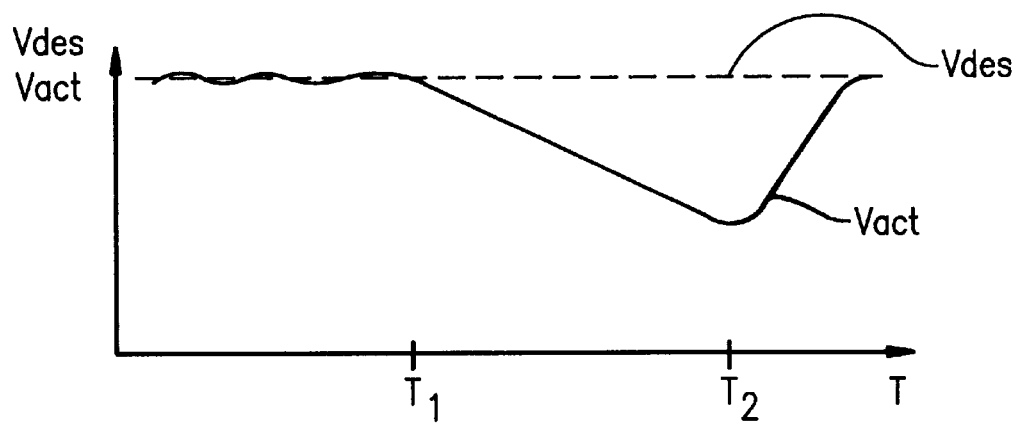
FIG. 3a is a graph of speed plotted as a function of time and shows the operation of the solution of the invention.
Figure 3B:
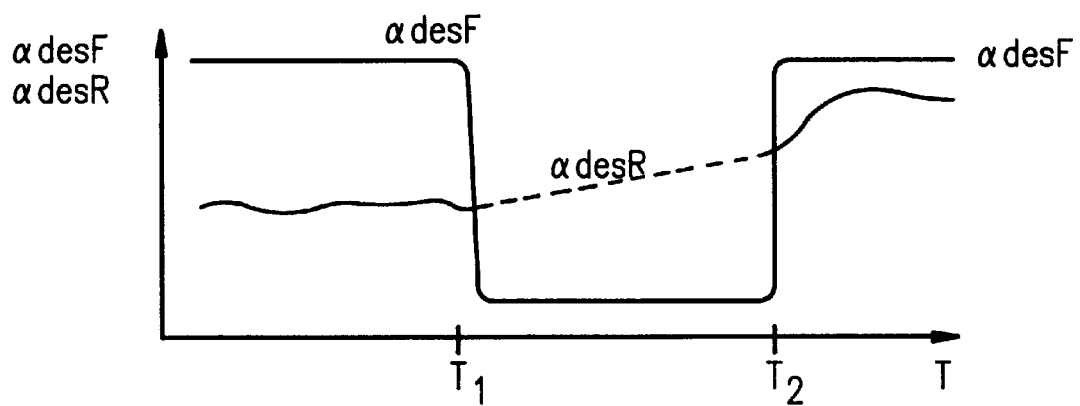
FIG. 3b is a graph showing acceleration plotted as a function of time and likewise shows the effect of the solution of the invention.

The advantageous operation is shown also by the time-dependent graphs of FIGS. 3a and 3b. In FIG. 3a, the time-dependent trace of the desired and actual speeds is shown and, in FIG. 3b, the time-dependent traces of the adjusting quantity αdesF produced by the driver and of the adjusting quantity αdesR produced by the controller are shown.

The speed controller is first in operation so that the actual speed is limited to the desired speed. At time point T1, the driver releases the accelerator pedal. This means that the adjusting quantity, which is pregiven by the driver, drops below the adjusting quantity of the controller. Accordingly, the power adjusting element is, starting at this time point, controlled by the driver input which leads to a reduction of the vehicle speed between the time points T1 and T2 as shown in FIG. 3a. In this time range, between leaving (time point T1) and reentry (time point T2) into the control region of the speed controller, the controller upper limit is computed in accordance with the difference between the desired and actual speeds or between the actual speed at time point T1 and the particular speed then present.

Outside of the control region, the adjusting quantity of the controller accordingly runs in correspondence to the path shown by the dotted line in a direction of greater values. At time point T2, the driver actuates the pedal in such a manner that the driver input value crosses over the input value of the controller. Accordingly, the controller becomes active again starting at time point T2 and limits the actual speed again to the desired speed. Overshoots and undershoots are effectively avoided with the input of the suitable start value in accordance with the solution provided by the invention.

The corresponding procedure can also be applied for the application of an acceleration controller to limit road speed.

Figure 4:
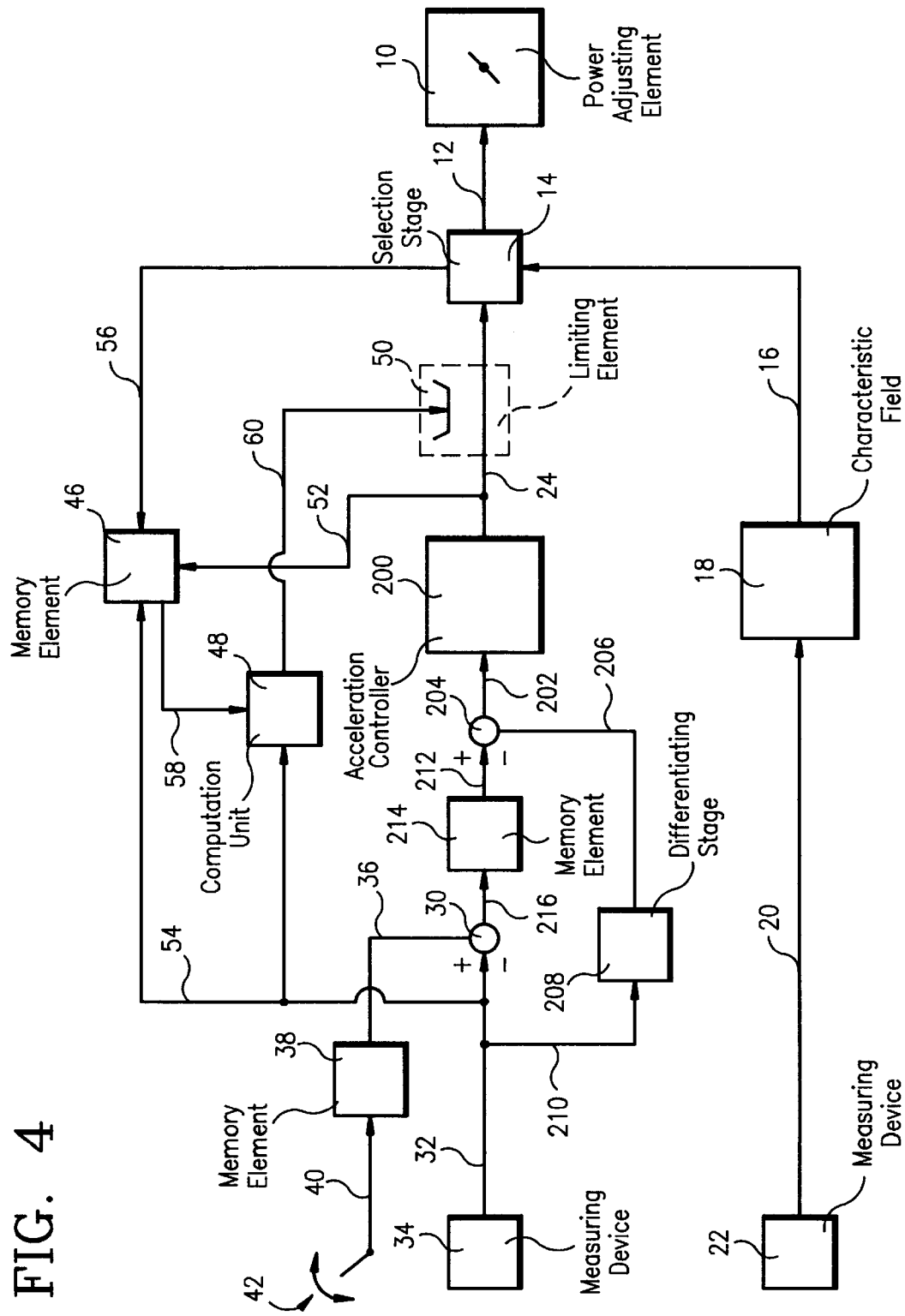
FIG. 4 is an overview block circuit diagram of a solution according to a second embodiment of the speed controller utilized for limiting speed.

FIG. 4 is an overview block diagram of a system of this kind. Here, those elements which correspond to elements of FIG. 1 are identified by the same reference numerals and are not discussed again below.

In the preferred embodiment, the acceleration controller 200 is, in the manner already described with respect to the speed controller, a controller, which is imprecise in the steady state, and can, for example, be a PDT1-controller. This controller forms an adjusting signal for the power adjusting element in dependence upon the difference between a desired acceleration and an actual acceleration. This difference is supplied to the controller 200 via a line 202 from a comparator 204. A line 206 from a differentiating stage 208 is connected to the comparator 204 and a line 210 from line 32 is connected to the differentiating stage 208.

The differentiating stage 208 forms the actual acceleration Bact from the actual speed supplied via the line 210. A further line 212 from memory element 214 is connected to the comparator 204. A line 216 defines the output of the logic element 30 and is connected to the memory element 214. Characteristic lines are stored in the memory element 214 and image the desired acceleration Bdes in dependence upon the difference between the desired and actual speeds. In another embodiment, the desired acceleration Bdes is dependent only on the actual speed. The comparator 204 forms the control deviation (that is, the difference between desired and actual accelerations) which is converted by the acceleration controller 200 into a corresponding adjusting quantity. Here too, as with the speed controller described above, the upper limit of the output value of the controller is computed in accordance with the speed difference when leaving the control region.

It is especially advantageous in this connection that a hysteresis is provided when switching over from driver control to controller control and vice versa. This hysteresis can also be utilized in connection with the speed controller. Thereafter, there is a movement out of the control region when the input value generated by the driver is less than that of the controller. Limiting the controller upper boundary is, however, only started when the input value, which is generated by the driver, is less by a specific amount than the input value of the controller. Correspondingly, there is a reentry into the control region when the input value of the controller drops below the input value of the driver.

Figure 5:
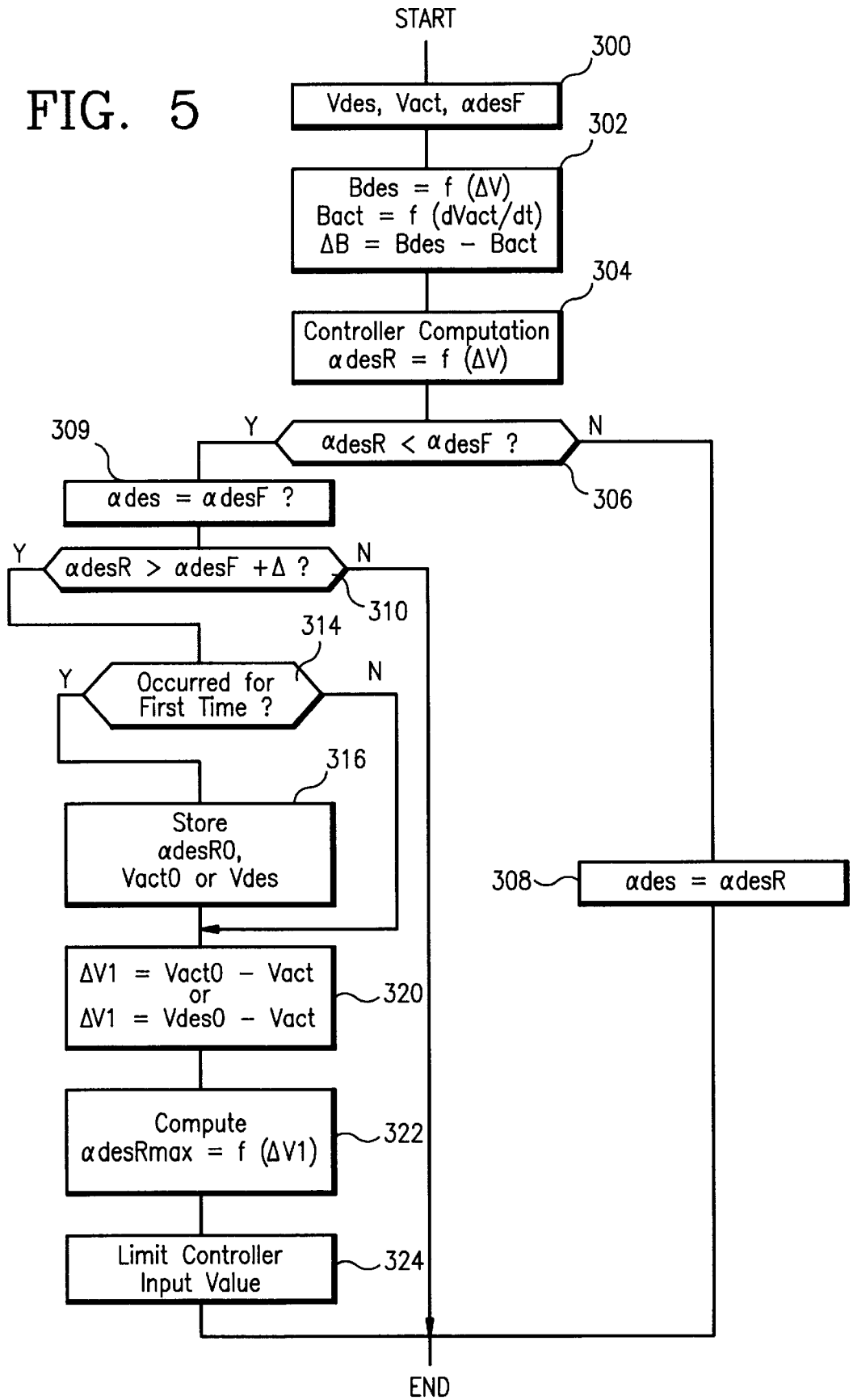
FIG. 5 is a flowchart showing a second embodiment of the method of the invention in the context of a computer program.

In the same manner as in FIG. 2, the procedure for an acceleration controller is shown as a flowchart in FIG. 5.

Here too, the desired speed Vdes, actual speed Vact and driver input αdesF are read in at the start of the subprogram in the first step 300 at pregiven time points. In the next step 302, the desired acceleration is determined in dependence upon the speed difference, the actual acceleration as well as the acceleration difference. In step 304, the controller input value αdesR is formed in dependence upon the acceleration difference. In the next inquiry step 306, a check is made as to whether the controller input value αdesR is greater than the driver input value αdesF. If this is not the case, then the input quantity αdes for the power adjusting element is formed in accordance with step 308 via the controller input value αdesR.

If the controller input value is greater than the driver input value, then, in step 309, the adjusting quantity αdes for the power adjusting element is formed via the driver input value αdesF. Thereafter, in step 310, a check is made as to whether the controller input value αdesR is greater by a specific amount Δ than the driver input value αdesF. If this is not the case, then the subprogram is ended after step 308 and repeated at a given time.

If the input value of the controller is greater than the driver input value by a specific amount, then, in step 314, a check is made as to whether this result occurred for the first time after leaving the control region. According to step 316, this leads to storing the controller input value αdesR0 and the actual speed Vact0 or the desired speed Vdes.

In the next step 320, the speed difference ΔV1 is computed as in the first embodiment and, in step 322, the control upper limit αdesRmax is determined. In step 324, the controller input value, which is computed in this operating state, is limited to this maximum value and the subprogram is ended as after steps 308 and 310.

Figure 6A:
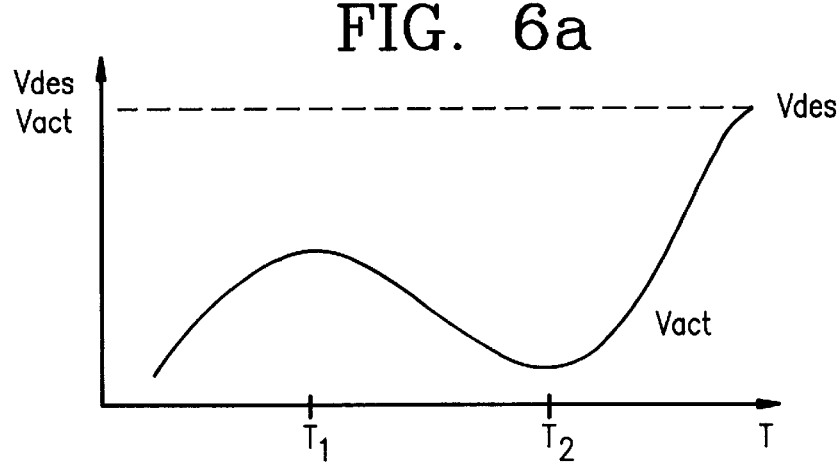
FIG. 6a shows the time-dependent traces of the actual and desired speeds.
Figure 6B:
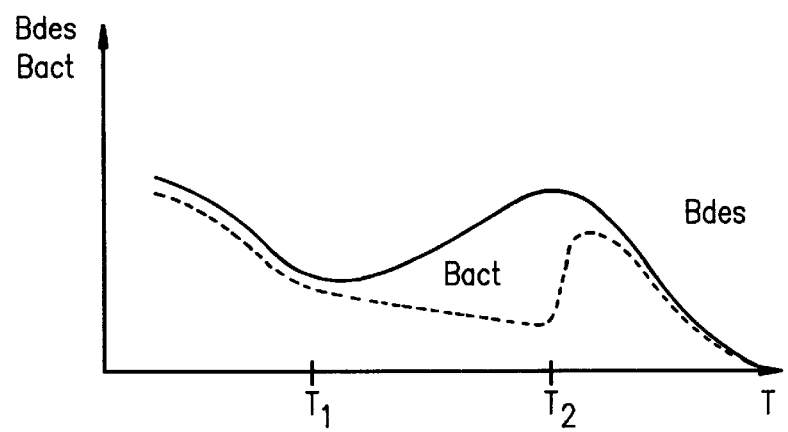
FIG. 6b shows the time-dependent traces of the actual and desired accelerations; and, FIG. 6c shows the time-dependent traces of the input values of the driver and the controller.
Figure 6C:
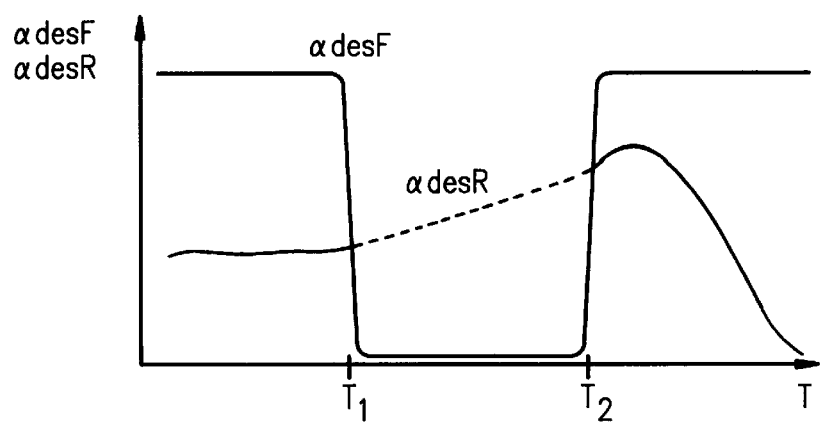

The operation of the solution of the invention is shown with respect to the acceleration controller in FIGS. 6a to 6c. In FIG. 6a, the time-dependent traces of the actual and desired speeds are shown and in FIG. 6b, the time-dependent traces of the actual and desired accelerations are shown. In FIG. 6c, the traces of the input value αdesF of the driver and the input value αdesR of the controller are shown.

First, an operating situation is assumed in which the driver completely actuates the accelerator pedal so that the speed is brought to the limit speed via the acceleration controller. This takes place via control of the actual acceleration to the desired acceleration in accordance with FIG. 6b in advance of the time point T1. Shortly before time point T1, the driver releases the accelerator pedal so that the driver input value drops below the controller input value. If the driver input value drops below the controller value by a specific amount at time point T1, the upper limit determination of the controller value is started in accordance with the invention.

As a consequence of releasing the accelerator pedal, the speed drops between the time points T1 and T2 (and correspondingly, the acceleration) so that the controller upper limit increases in dependence upon the speed difference which is becoming greater. At time point T2, the driver presses on the accelerator pedal all the way down so that the controller again enters the control region at time point T2. The speed of the vehicle increases under the action of the acceleration controller and oscillates into the desired speed. With the procedure of the invention, the controller starts at time point T2 (with the reentry into the control region) with suitable start values which effectively prevent overshoots and undershoots.

It is understood that the foregoing description is that of the preferred embodiments of the invention and that various changes and modifications may be made thereto without departing from the spirit and scope of the invention as defined in the appended claims.

What is claimed is:

1. A method for controlling or limiting the speed of a vehicle having a controller, the method comprising the steps of:

providing an actuator for influencing said speed of said vehicle;

detecting the speed (Vact) of said vehicle;

forming an adjusting value (αdesR) for said actuator in said controller in dependence upon said speed (Vact) and a pregiven desired speed (Vdes), said controller defining a control region wherein said adjusting value (αdesR) is effective to control said actuator and said vehicle being driveable in at least one operating state which is accompanied by a movement out of said control region with said adjusting value (αdesR) no longer operating on said actuator;

forming a start value (αdesRmax) for said controller for said adjusting value (αdesR) at the end of said operating state which is accompanied by a reentry into said control region with said start value (αdesRmax) being generated in dependence upon a change of speed (ΔV1) of said vehicle outside of said control region;

wherein said controller generates an output signal and the method includes the further steps of:

determining a speed difference between a value of said pregiven desired speed (Vdes) and a value of said speed (Vact) outside of said control region; and, when the movement out of said control region takes place, fixing a limit value for the output signal of said controller in dependence upon said speed difference and limiting the value of said output signal to said limit value.

2. The method of claim 1, wherein said limit value is an upper limit of said controller.

3. A method for controlling or limiting the speed of a vehicle having a controller, the method comprising the steps of:

providing an actuator for influencing said speed of said vehicle;

detecting the speed (Vact) of said vehicle;

forming an adjusting value (αdesR) for said actuator in said controller in dependence upon said speed (Vact) and a pregiven desired speed (Vdes), said controller defining a control region wherein said adjusting value (αdesR) is effective to control said actuator and said vehicle being driveable in at least one operating state which is accompanied by a movement out of said control region with said adjusting value (αdesR) no longer operating on said actuator;

forming a start value (αdesRmax) for said controller for said adjusting value (αdesR) at the end of said operating state which is accompanied by a reentry into said control region with said start value (αdesRmax) being generated in dependence upon a change of speed (ΔV1) of said vehicle outside of said control region;

when moving out of said control region, storing the following: said adjusting value (αdesR) and the speed (Vact) of the vehicle;

storing start values for when there is a movement out of said control region;

determining a speed difference between said pregiven desired speed (Vdes) and said speed (Vact) outside of said control region; and, changing an upper limit for said adjusting value (αdesR) starting with said start values and in accordance with the speed difference outside of said control region.

4. The method of claim 3, wherein a speed (Vact) is stored as a stored speed (Vact) when leaving said control region; and, said speed difference as a difference between said stored speed (Vact) and the said speed (Vact) or between the desired speed (Vdes) and the speed (Vact).

5. The method of claim 4, wherein comprising the further steps of: detecting an actual acceleration of said vehicle; and, deriving a desired acceleration from said speed (Vact); said controller operates on the basis of a difference between the desired speed (Vdes) and the speed (Vact) or a difference between said desired acceleration derived from the speed (Vact) and the actual acceleration.

6. The method of claim 5, wherein a driver of the vehicle applies an adjusting input value to said controller; and, wherein the method comprises the further step of leaving said control region when the adjusting input value generated by the driver is less than the adjusting value (αdesR) generated by the controller or a difference between the desired speed and the speed (Vact) exceeds a pregiven threshold value.

7. The method of claim 6, wherein said controller generates an output; and wherein the method comprises the further step of, in said at least one operating state, adjusting the actuator influencing the speed of the vehicle in dependence upon said adjusting input value of the driver and, within said operating region, in dependence upon the output of said controller.

8. An arrangement for controlling or limiting the speed of a vehicle, the arrangement comprising:

an actuator for influencing said speed of said vehicle;

a measuring device for detecting the speed (Vact) of said vehicle;

a controller configured to form an adjusting value ($\alpha$desR) in dependence upon said speed (Vact) and a pregiven desired speed (Vdes);

said controller defining a control region wherein said adjusting value ($\alpha$desR) is effective to control said actuator and said vehicle being driveable in at least one operating state which is accompanied by a movement out of said control region with said adjusting value ($\alpha$desR) no longer operating on said actuator; and, means for forming a start value ($\alpha$desRmax) for said controller for said adjusting value ($\alpha$desR) at the end of said operating state which is accompanied by a reentry into said control region with said start value ($\alpha$desRmax) being generated in dependence upon a change of speed ($\Delta$V1) of said vehicle outside of said control region.

9. A method for controlling or limiting the speed of a vehicle having a controller, the method comprising the steps of:

providing an actuator for influencing said speed of said vehicle;

detecting the speed (Vact) of said vehicle;

forming an adjusting value ($\alpha$desR) for said actuator in said controller in dependence upon said speed (Vact) and a pregiven desired speed (Vdes), said controller defining a control region wherein said adjusting value ($\alpha$desR) is effective to control said actuator and said vehicle being driveable in at least one operating state which is accompanied by a movement out of said control region with said adjusting value ($\alpha$desR) no longer operating on said actuator; and, forming a start value ($\alpha$desRmax) for said controller for said adjusting value ($\alpha$desR) at the end of said operating state which is accompanied by a reentry into said control region with said start value ($\alpha$desRmax) being generated in dependence upon a change of speed ($\Delta$V1) of said vehicle outside of said control region.

10. The method of claim 9, further comprising the step of: when moving out of said control region, storing the following: said adjusting value ($\alpha$desR) and the speed (Vact) of the vehicle.

11. The method of claim 9, wherein the reentry into said control region defines a transition to a control region wherein said adjusting value ($\alpha$desR) is effective to control said actuator from an operating state wherein said adjusting value ($\alpha$desR) no longer operates on said actuator; and, said start value ($\alpha$desRmax) avoids overshoots and undershoots associated with said transition.

* * * * *

UNITED STATES PATENT AND TRADEMARK OFFICE
CERTIFICATE OF CORRECTION

PATENT NO. : 5,992,551
DATED : November 30, 1999
INVENTOR(S) : Thomas Frey and Tobias Roulet It is certified that error appears in the above-identified patent and that said Letters Patent is hereby corrected as shown below:

Column 5,
Line 22, delete "220" and substitute -- 120 -- therefor.

Column 8,
Line 48, delete "as" and substitute -- is -- therefor.

Signed and Sealed this

Thirty-first Day of July, 2001

Attest:

NICHOLAS P. GODICI
Attesting Officer
Acting Director of the United States Patent and Trademark Office